United States Patent
Edelsten et al.

(10) Patent No.: US 9,177,121 B2
(45) Date of Patent: Nov. 3, 2015

(54) CODE PROTECTION USING ONLINE AUTHENTICATION AND ENCRYPTED CODE EXECUTION

(71) Applicant: NVIDIA Corporation, Santa Clara, CA (US)

(72) Inventors: Andrew Edelsten, Mountain View, CA (US); Fedor Fomichev, Sunnyvale, CA (US); Jay Huang, Sunnyvale, CA (US); Timothy Paul Lottes, Milpitas, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 13/691,613

(22) Filed: Nov. 30, 2012

(65) Prior Publication Data

US 2014/0157423 A1    Jun. 5, 2014

(51) Int. Cl.
*G06F 21/10* (2013.01)
*G06F 21/53* (2013.01)
*G06F 21/12* (2013.01)

(52) U.S. Cl.
CPC .............. *G06F 21/10* (2013.01); *G06F 21/121* (2013.01); *G06F 21/53* (2013.01)

(58) Field of Classification Search
CPC ................................ G06F 21/10; G06F 21/121
See application file for complete search history.

(56) References Cited

U.S. PATENT DOCUMENTS

| | | | |
|---|---|---|---|
| 7,930,537 B2 | 4/2011 | Paatero | |
| 8,499,304 B2 | 7/2013 | De Los Reyes | |
| 2005/0160210 A1 | 7/2005 | Watt | |
| 2009/0172331 A1 | 7/2009 | Vembu | |
| 2009/0210709 A1 | 8/2009 | Fujiwara | |
| 2010/0146292 A1* | 6/2010 | Shi et al. | 713/189 |
| 2010/0153667 A1 | 6/2010 | Andersson | |
| 2011/0154436 A1 | 6/2011 | Jian | |
| 2011/0289294 A1 | 11/2011 | Maeda | |
| 2012/0260250 A1 | 10/2012 | Maeda | |

FOREIGN PATENT DOCUMENTS

TW    201123808    7/2011

* cited by examiner

*Primary Examiner* — Gilberto Barron, Jr.
*Assistant Examiner* — Simon Kanaan

(57) ABSTRACT

Methods for code protection are disclosed. A method includes using a security processing component to access an encrypted portion of an application program that is encrypted by an on-line server, after a license for use of the application program is authenticated by the on-line server. The security processing component is used to decrypt the encrypted portion of the application program using an encryption key that is stored in the security processing component. The decrypted portion of the application program is executed based on stored state data. Results are provided to the application program that is executing on a second processing component.

20 Claims, 11 Drawing Sheets

CODE PROTECTION USING ONLINE AUTHENTICATION AND ENCRYPTED CODE EXECUTION

CROSS-REFERENCE TO RELATED APPLICATION

This application is related to U.S. patent application Ser. No. 13/458,891, filed Apr. 27, 2012, entitled "CONTENT PROTECTION VIA ONLINE SERVERS AND CODE EXECUTION IN A SECURE OPERATING SYSTEM" which is hereby incorporated herein by reference in its entirety.

BACKGROUND

Code Protection (CP) technologies encompass a class of access control technologies that are used by hardware manufacturers, publishers, copyright holders and individuals as a means of controlling the use of digital content and devices. CP technologies include technologies that inhibit uses of digital content that are not desired or intended by the content provider.

CP technologies seek to provide control of digital content or devices to a content provider or device seller after it has been purchased by a consumer. As it relates to digital content, such control can include preventing access to content, preventing content copying and preventing the conversion of content to other formats. As it relates to devices, such control can include restricting the hardware and software that can be used with a device.

Some conventional CP technologies are susceptible to specific types of attack. For example, software based CP technologies can be susceptible to attacks that are based on information that is contained by the software itself because the software can include information that can enable the decryption of content (e.g., decryption keys). Consequently, an attacker may be able to extract this information and decrypt and copy the content directly, and thereby bypass the restrictions imposed by the CP system Hardware based CP technologies have susceptibilities as well. Some of these technologies require the use of purpose built hardware to hear and/or to see content. This approach attempts to ensure that only licensed users (those with the hardware) can access the content. In addition, it seeks to deny system users access to the secret decryption key.

However, although hardware based CP technologies can provide robust protection, it can be very difficult to build hardware that is sufficiently robust to protect a secret key against a sufficiently determined adversary. Moreover, once the secret key is known, building a version of the hardware that can be used to hear and/or see content can be relatively straightforward. Accordingly, conventional technologies can lack a level of protection that is sufficient to deter determined adversaries.

SUMMARY

Conventional approaches to code protection can lack a level of protection that is sufficient to deter determined adversaries. A code protection hardware security processing component, architecture and method that uses on-line authentication and encrypted code execution are disclosed that addresses these shortcomings. However, the claimed embodiments are not limited to implementations that address any or all of the aforementioned shortcomings. In one embodiment, after the verification of a license to use an application has been completed, a security processing component is used as a part of a secure, hardware based, decryption and execution of a piece of program code or "shader" that is missing from the application. The results of the execution of the piece of program code are utilized such that upon execution, the application can function properly. In exemplary embodiments, the security processing component is used in conjunction with an online server and a license verification server, such that a multileveled, code protection architecture is provided that is sufficiently strong to deter determined adversaries.

In one embodiment, after a license to use an application is verified by a license verification server, a security processing component is used to access an encrypted portion of the application that is encrypted by an on-line server. The security processing component thereafter decrypts the encrypted portion of the application, using an encryption key that is stored by the security processing component, and executes the decrypted portion of the application based on stored state data. The results of the execution of the decrypted portion of the application are provided to the application which executes on a second processing component.

In one embodiment, a graphics processing component executes the decrypted portion of the application. In one embodiment, the graphics processing component executes the decrypted portion of the application in a designated video protected region of memory. However, in one embodiment, the capacity to read from the video protected region is restricted to the security processing component. In one embodiment, the graphics processing component, executes a second piece of program code, related to the application, in a non-video protected region of memory.

In one embodiment, the state data is maintained on the chip on which the security processing component is formed. In one embodiment, the security processing component encodes and decodes state data, and this state data is maintained off of the chip on which the security processing component is formed.

BRIEF DESCRIPTION OF THE DRAWINGS

The invention, together with further advantages thereof, may best be understood by reference to the following description taken in conjunction with the accompanying drawings in which.

It should be noted that like reference numbers refer to like elements in the figures.

DETAILED DESCRIPTION

Figure 1A:
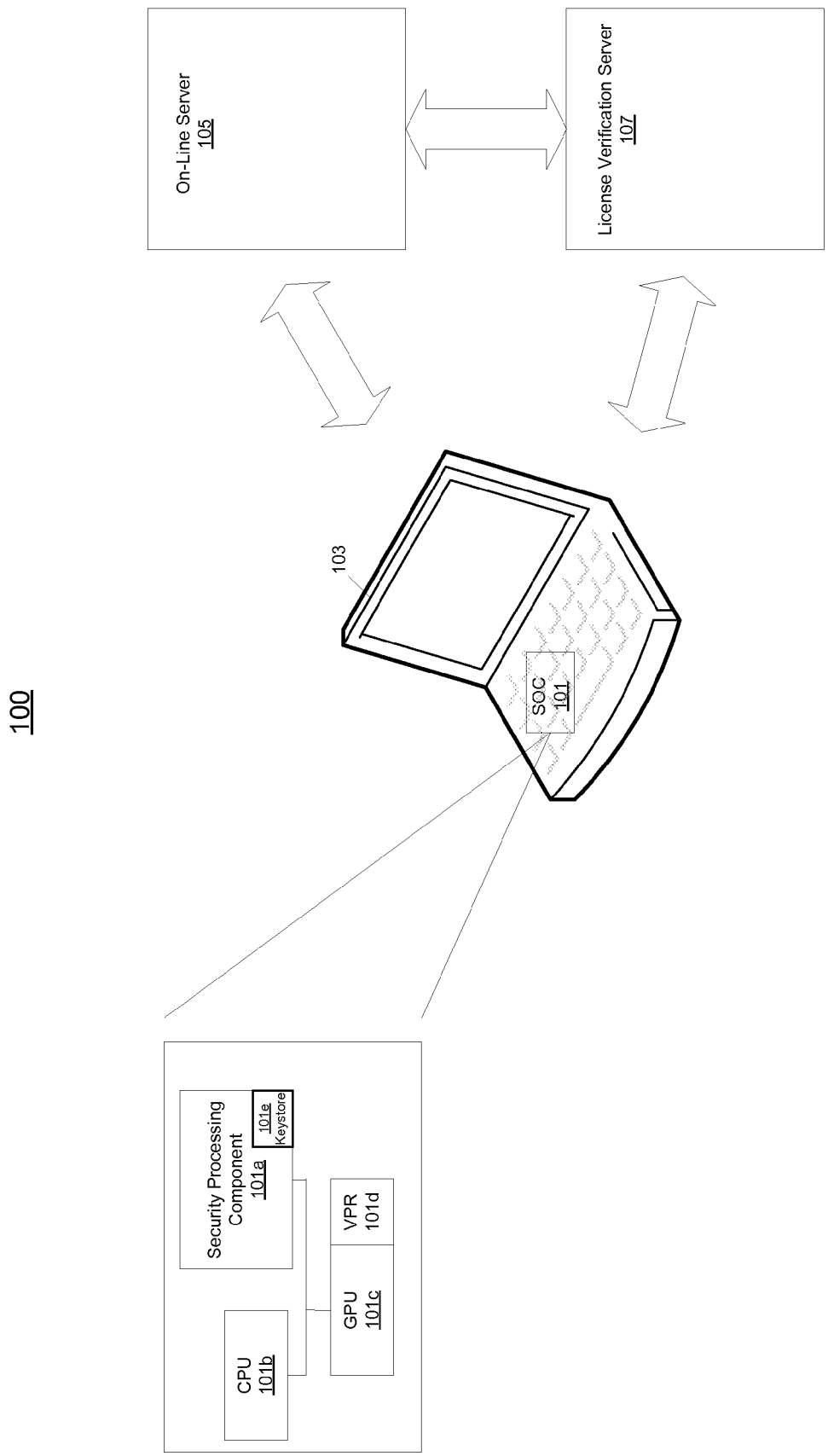
FIG. 1A shows an exemplary operating environment of a code protection security processing component according to one embodiment.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "decrypting" or "executing" or "providing" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Exemplary Operating Environment of Components of a Code Protection Architecture that Includes a Security Processing Component that Uses Online Authentication and Encrypted Code Execution According to One Embodiment FIG. 1A shows an exemplary operating environment 100 of components of a code protection architecture that includes a security processing component 101 according to one embodiment. In one embodiment, security processing component 101 provides secure hardware decryption of a piece of program code that is missing from a main application to which it corresponds, and is used in conjunction with an online server 105 and a license verification server 107 such that a multileveled copy protection architecture that is sufficiently strong to deter determined adversaries is provided. FIG. 1A shows system on chip (SoC) 101, device 103, on-line server 105 and license verification server 107. In the FIG. 1A embodiment, SoC 101 includes security processing component 101a, CPU 101b, GPU 101c, video protected region (VPR) 101d and keystore 101e.

Figure 1B:
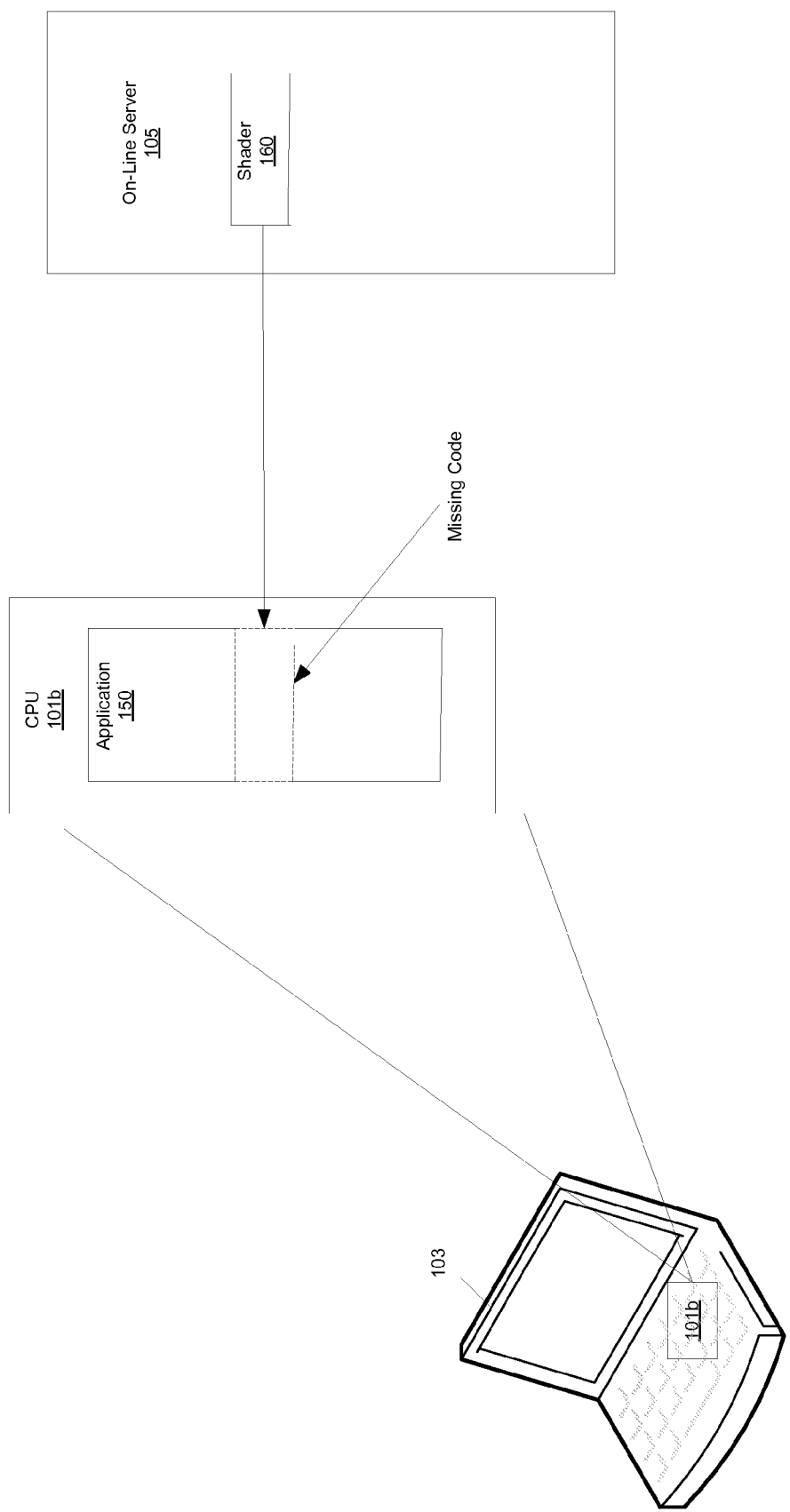
FIG. 1B illustrates operations performed by components that are a part of a code protection architecture according to one embodiment.

Referring to FIG. 1A, device 103 is a platform that is used to operate an application that is installed thereon. In one embodiment, a piece of program code from this application, or "shader", that is relied upon for proper operation of the application, is maintained at on-line server 105 as is shown in FIG. 1B. Consequently, referring to FIG. 1B, attempts to run an application 150 on device 103 without obtaining the missing piece of program code 160 from on-line server 105 will result in application 150 not operating properly. In one embodiment, the piece of program code 160 can be downloaded from on-line server 105 after the user's license to operate the application has been verified. However, on-line server 105 encrypts the piece of program code 160 such that the capacity to decrypt it is restricted to a security processing component (e.g., 101a in FIG. 1A) that is associated with device 103. Thus, the capacity to decrypt the piece of code is restricted to device 103.

Referring again to FIG. 1A, security processing component 101a is a processing core that can be formed as a part of the semiconductor material from which the main system processor, CPU 101b, is formed or as a part of a discrete GPU 101c. In another embodiment, security processing component 101a, CPU 101b, and GPU 101c can all be a part of a system on chip 101 as shown in FIG. 1A. In one embodiment, security processing component 101a provides a secure space in which to decrypt and execute a designated piece of program code (e.g., 160 in FIG. 1B). The results generated from the execution of the program code in the secure space provided by security processing component 101a can be provided to a main application (e.g., 150 in FIG. 1B) executing on CPU 101b for use in the execution of the main application. In one embodiment, security processing component 101a can include a keystore 101e where a secret encryption key that can be used to decrypt the piece of program code (e.g., 160 in FIG. 1B) is maintained. In one embodiment, the secret encryption key can be formed in fuses during the chip manufacturing process. In one embodiment, security processing component 101a has exclusive access to the secret encryption key that is formed therein (the secret key may not be accessed by either CPU 101b or GPU 101c).

CPU 101b is the main system processor. In one embodiment, CPU 101b executes the main application (e.g., 150 in FIG. 1B). In one embodiment, a license to operate the main application (e.g., 150 in FIG. 1B) is verified before a missing a piece of the main application's code (e.g., 160 in FIG. 1B) is provided to security processor 101a (or to GPU 101c in other embodiments) to run. The results generated by security processor 101a (or by GPU 101c in other embodiments) are provided to the main application (e.g., 150 in FIG. 1B) for use by CPU 101b in the execution of the main application. In one embodiment, CPU 101b does not have access to the secret encryption key that is maintained by security processing component 101a.

GPU 101c is a graphics processor that can be used to execute a decrypted version of the missing piece of the main application's program code (e.g., 160 in FIG. 1B) in one embodiment. In one embodiment, GPU 101c can execute the piece of program code (e.g., 160 in FIG. 1B) from VPR 101d. However, access to the execution results is restricted to security processing component 101a. In exemplary embodiments, GPU 101c, as CPU 101b, may not have access to the secret encryption key that is maintained by security processing component 101a. The decrypted version of the missing piece of the main application's program code (e.g., 160 in FIG. 1B) is provided to GPU 101c from security processing component 101a.

Video protected region (VPR) 101d is a secure section of memory (e.g., RAM) that provides a secure execution area for the missing piece of the main application's program code (e.g., 160 in FIG. 1B). In one embodiment, video protected region 101d is a section of memory into which any process can write, but is protected at the hardware level such that reads are restricted to trusted clients. For example, in one embodiment, security processing component 101a can read from VPR 101d, but CPU 101b is not allowed to read from VPR 101d. In another embodiment, both read and write accesses to VPR 101d are restricted to security processing component 101a.

On-line server 105 verifies the signature of devices (e.g., 103), plays a part in application license verification operations and, if a license is verified, encrypts a missing piece of the application's program code (e.g., 160 in FIG. 1B) or "shader" using an encryption key that corresponds to the unique ID of the involved device (e.g., device 103). Thereafter, on-line server 105 provides the encrypted missing piece of program code (e.g., 160 in FIG. 1B) to the application (e.g., 150 in FIG. 1B) which in turn provides the encrypted missing piece of program code (e.g., 160 in FIG. 1B) to security processing component 101a for decryption. In one embodiment, on-line server 105 stores a unique ID and encryption key for each device (e.g., device 103) designated for code protection by the vendor of the devices. In one embodiment, the missing piece of program code (e.g., 160 in FIG. 1B) is encrypted using an encryption key that corresponds to the unique ID of the device. In one embodiment, the vendor maintains a database of such private encryption keys such that on-line server 105 and security processing component 101a can securely authenticate each other.

License verification server 107 verifies the licenses of applications (e.g., 150 in FIG. 1B) that seek to have their licenses verified such that they can be enabled to operate normally on a particular device (e.g., device 103). The verification of an application's license prompts the on-line server to encrypt a missing piece of the application's program code (e.g., 160 in FIG. 1B) and provide it to the application (e.g., 150 in FIG. 1B), such that it can be decrypted and used in the execution of the application.

Operation

Figure 1C:
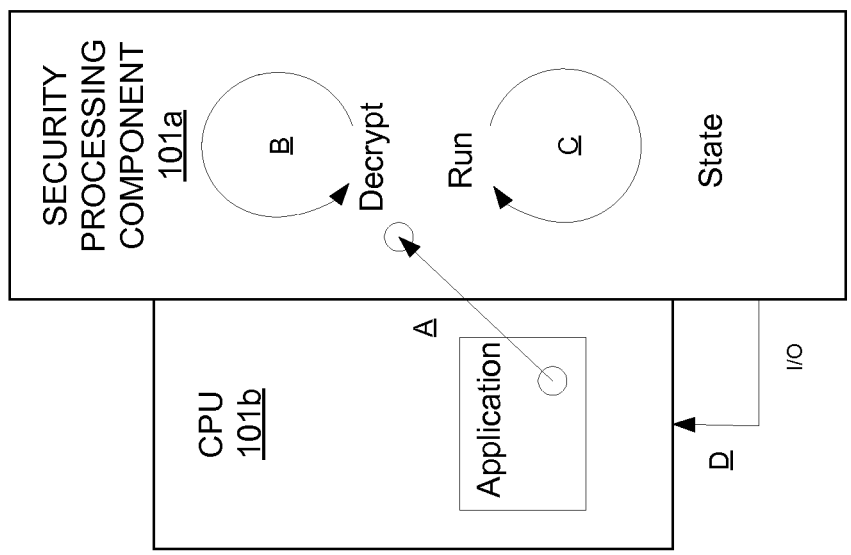
FIG. 1C illustrates operations performed by components that are a part of a code protection architecture according to one embodiment.
Figure 1D:
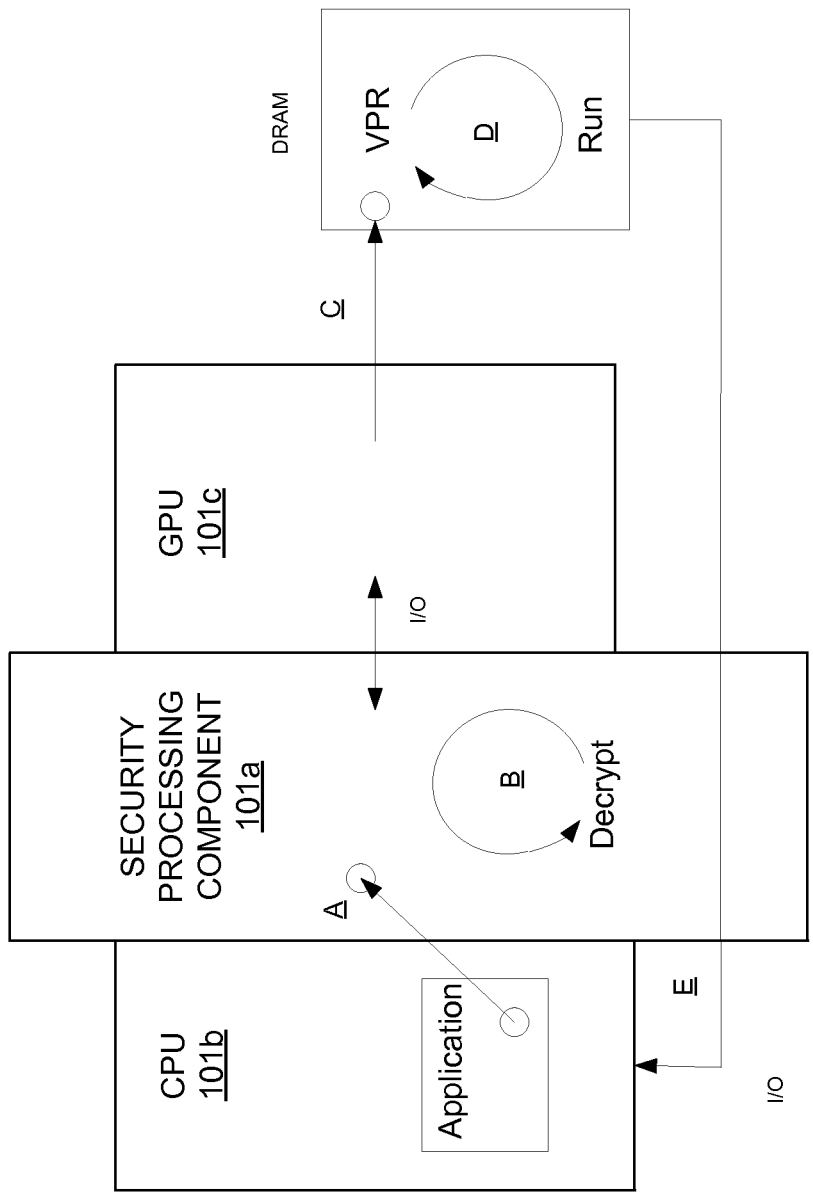
FIG. 1D illustrates operations performed by components that are a part of a code protection architecture according to one embodiment.
Figure 1E:
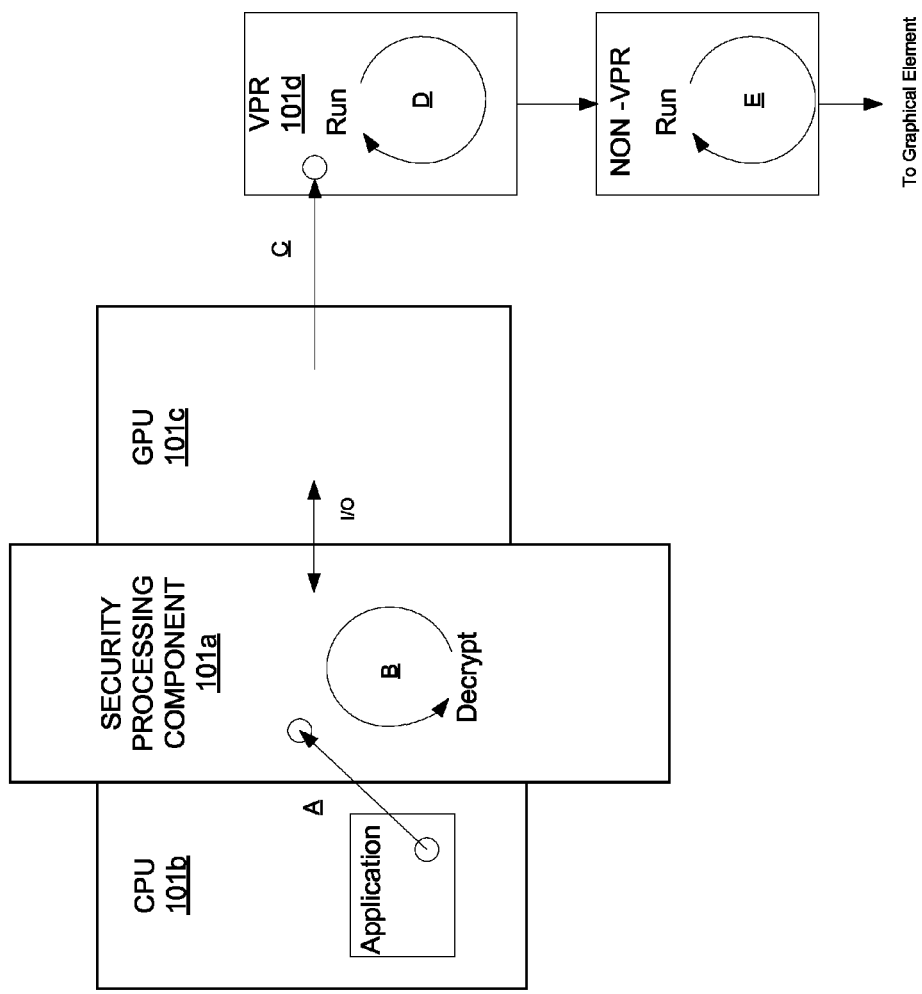
FIG. 1E illustrates operations performed by components that are a part of a code protection architecture according to one embodiment.

FIGS. 1C-1E illustrates operations performed by components that are a part of a code protection architecture according to one embodiment. These operations, which relate to code protection using online authentication and encrypted code execution are illustrated for purposes of clarity and brevity. It should be appreciated that other operations not illustrated in FIGS. 1C-1E can be performed in accordance with one embodiment.

Security Processing Component Running of Decrypted Code

Referring to FIG. 1C, at A, after a license to operate an application (e.g., 150 in FIG. 1B), that has been installed on a device (e.g., 103 in FIG. 1A), and that is executing on CPU 101b is verified by an on-line server (e.g., 105 in FIG. 1A), an encrypted piece of program code, or "shader", that corresponds to the application (e.g., 150 in FIG. 1B), is accessed by the application (e.g., 150 in FIG. 1B) and provided to security processing component 101a, for decryption purposes.

At B, the encrypted piece of program code is decrypted by security processing component 101a. In one embodiment, security processing component 101a, decrypts the encrypted piece of program code using a secret encryption key that is maintained by security processing component 101a.

At C, the decrypted piece of program code is run by security processing component 101a. In one embodiment, the results are stored along with state data that is generated from the running of the code. In one embodiment, the state data is maintained on chip. In other embodiments, the state data is maintained off chip. In one embodiment, security processing component 101a can encode and/or decode the state data that is maintained off of the chip.

At D, access to the results generated from the run of the decrypted piece of program code, is provided to CPU 101b. In one embodiment CPU 101b uses the results in the execution of the corresponding application (e.g., 150 in FIG. 1B) executing thereon.

GPU Running of Decrypted Code

Referring to FIG. 1D, at A, after a license to operate an application (e.g., 150 in FIG. 1B) that has been installed on a device (e.g., 103 in FIG. 1A), and that is executing on CPU 101b, is verified by an on-line server (e.g. 105 in FIG. 1A), an encrypted piece of program code or "shader" (e.g., 160 in FIG. 1B), that corresponds to the application (e.g., 150 in FIG. 1B), is accessed by the application (e.g., 150 in FIG. 1B) and provided to security processing component 101a, for decryption purposes.

At B, the encrypted piece of program code is decrypted by security processing component 101a. In one embodiment, security processing component 101a, decrypts the encrypted piece of program code using a secret encryption key that is maintained by security processing component 101a.

At C, the decrypted piece of program code is stored in VPR 101e (e.g., a video protected region). In one embodiment, security processing component 101a can read from VPR 101e but CPU 101b cannot read from VPR 101e.

At D, the decrypted piece of program code is run by GPU 101c. In one embodiment, the results are stored in a buffer of VPR 101e.

At E, access to the results generated from the run of the decrypted piece of program code, is written to memory (e.g., RAM) and accessed by CPU 101b for use in the execution of the main application (e.g., 150 in FIG. 1B).

GPU Running of Second Shader from Non-VPR Location

Referring to FIG. 1E, the description of operations A-D shown therein is similar to the description of operations A-D shown in FIG. 1C and thus for purposes of clarity and brevity are not repeated.

Referring again to FIG. 1E, at E, after the decryption and running of the piece of program code or "shader" performed as a part of operations A-D, the results of the running of the piece of program code is used as input to the running of a second piece of program code or "shader" by GPU 101c from a non-video protected region. In one embodiment, the results that are generated from running the second piece of program code are provided to a texture, screen object or other graphical element.

In exemplary embodiments, any memory can be specified for downloading an encrypted piece of program code from which an input to the security processing component 101a can be made (cache, RAM etc.). Moreover, any memory can be specified to receive the output from the security processing component 101a. In one embodiment, input and output memory can be either encrypted or non-encrypted.

Components of Code Protection Component According to One Embodiment

Figure 2:
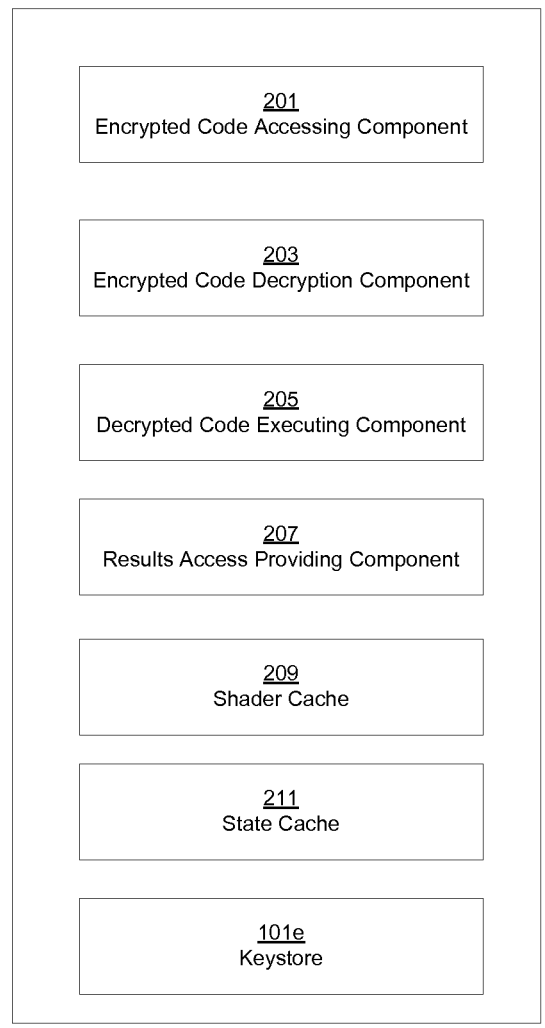
FIG. 2 shows components of a code protection security processing component according to one embodiment.

FIG. 2 shows components of a code protection security processing component 101a according to one embodiment. In one embodiment, components of system 101a, implement in hardware, an algorithm for code protection. In the FIG. 2 embodiment, components of security processing component 101a include encrypted code accessing component 201, encrypted code decryption component 203, decrypted code executing component 205, results access providing component 207, shader cache 209, state cache 211 and key store 101e.

Encrypted code accessing component 201 accesses a piece of program code (e.g., a "shader") that has been encrypted by an on-line server, from an application, to which the piece of program code corresponds that is executing on a CPU (e.g., CPU 101b in FIG. 1A). In one embodiment, the piece of program code (e.g., 160 in FIG. 1B) is relied upon for proper functioning of the application that is executing on the CPU.

Encrypted code decryption component 203 decrypts the encrypted piece of program code using an encryption key that is stored in key store 101e of security processing component 101a. In one embodiment, the decrypted piece of program code that results from the decryption is stored in shader cache 209 of security processing component 101a.

Decrypted code executing component 205 (optional) executes the decrypted piece of program code that is decrypted by encrypted code decryption component 203. In one embodiment, the execution results are stored in specified memory. In one embodiment, stored state data can be utilized in the execution of the decrypted piece of program code. In another embodiment, the execution of the decrypted piece of program code is performed by a GPU.

Results access providing component 207 provides access to the results that are generated by decrypted code executing component 205. In one embodiment, access to the execution results is provided to the application (e.g., 150 in FIG. 1B), to which the decrypted piece of program code corresponds (and that executes on the CPU). In one embodiment, when a GPU runs the decrypted piece of program code, the execution results are provided as input to the running of a second piece of program code in a non-VPR region.

Shader cache 209 stores the decrypted piece of program code that is decrypted by encrypted code decryption component 203. In one embodiment, the decrypted piece of program code is stored in shader cache 209 until a call from the main application to which the decrypted piece of program code corresponds is made that prompts its running.

Figure 4:
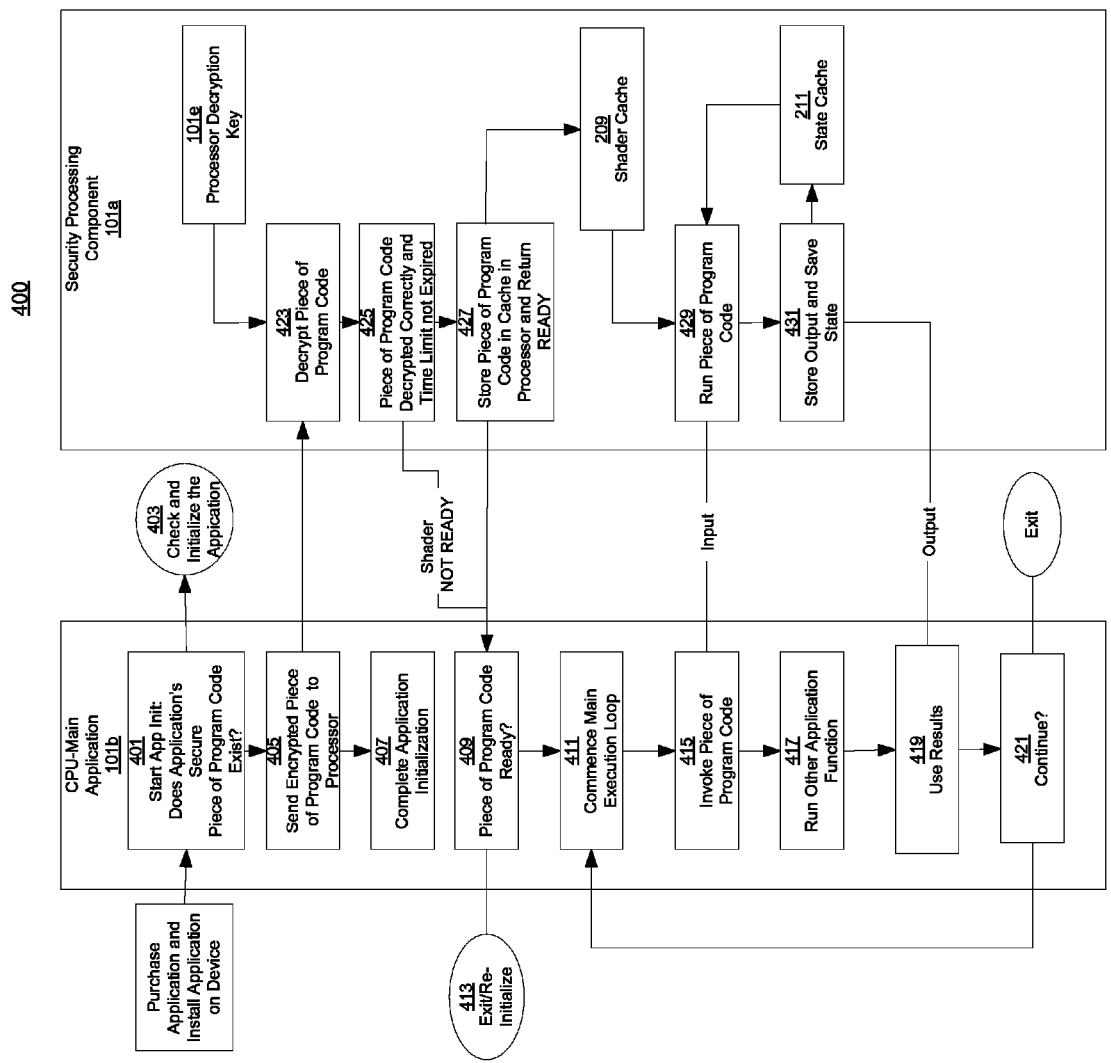
FIG. 4 shows a flowchart of operations that are performed in a method for code protection that uses online authentication and encrypted code execution where running of decrypted code is performed by a security processing component.
Figure 5:
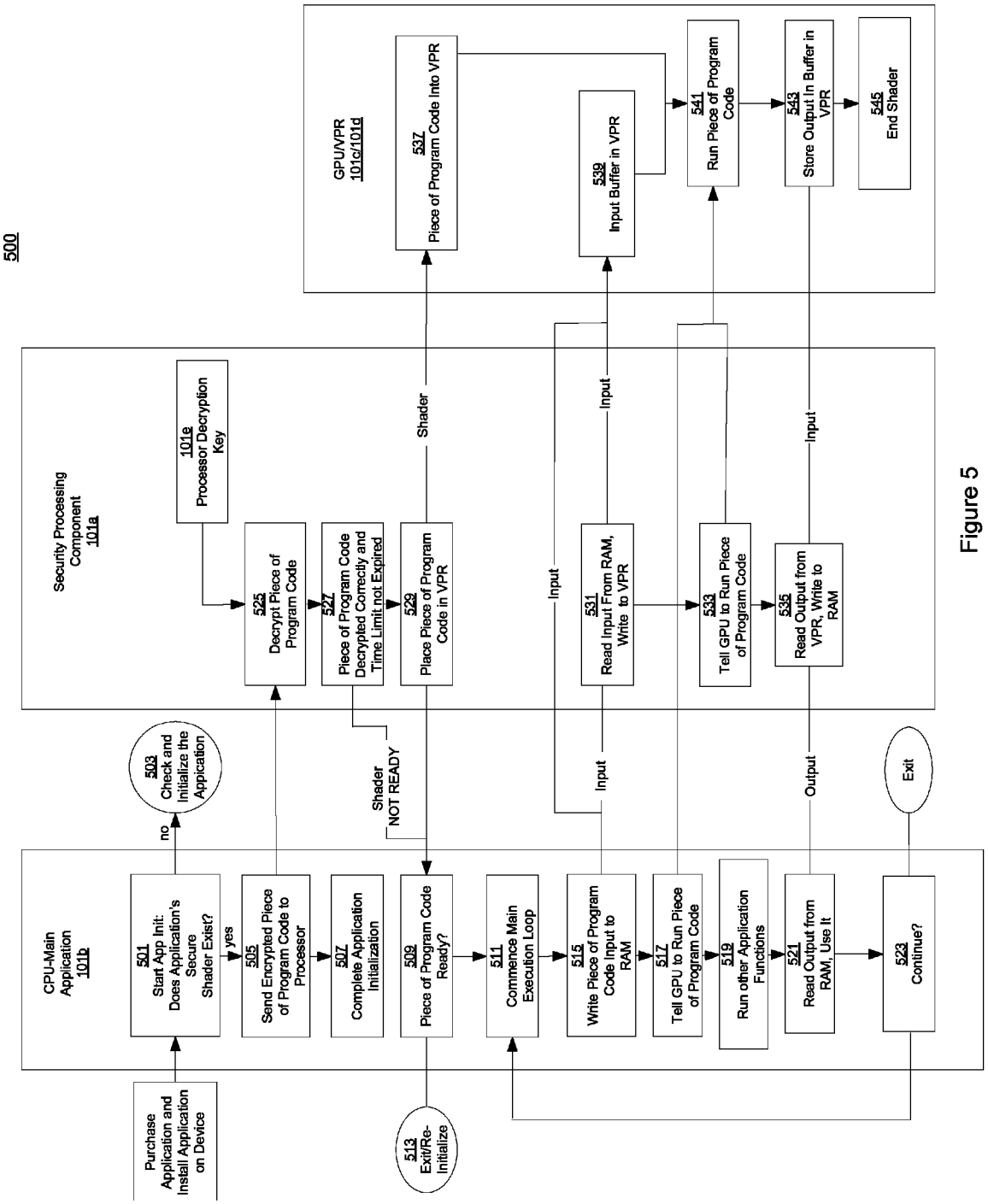
FIG. 5 shows a flowchart of operations that are performed in a method for code protection, that uses online authentication and encrypted code execution, where running of decrypted code is performed by a graphics processor unit (GPU).

State cache 211 stores state data that is provided as an input to the decrypted program code execution operations (described herein in detail with reference to FIGS. 4 and 5). In one embodiment, state data can include both short term and long term state data. In one embodiment, short term state data can include but is not limited to data derived from the previous execution of the piece of program code or "shader" that reflects a configuration of execution variables after that execution of the shader has been completed. In one embodiment, long term state data can include but is not limited to data such as player score attributes that are maintained and used to derive scores. In one embodiment, both short term and long term state data can be maintained on chip. In one embodiment, long term state data can be encoded and decoded by the security processing component and stored off chip.

Key store 101e stores a secret encryption key that is used to decrypt the piece of program code that is provided by an on-line server (e.g., 105 in FIG. 1A). In one embodiment, key store 101e stores an encryption key that corresponds to the unique ID of the device on which the application to which the piece program code corresponds is installed.

In one embodiment, the aforementioned components of security processing component 101a can be implemented in hardware. In one embodiment, components and operations of component 101a can be encompassed by components and operations of one or more computer components (e.g., CPU 101b or GPU 101c in FIG. 1A). In another embodiment, components and operations of system 101a can be separate from the aforementioned one or more computer components but can operate cooperatively with components and operations thereof.

Figure 3:
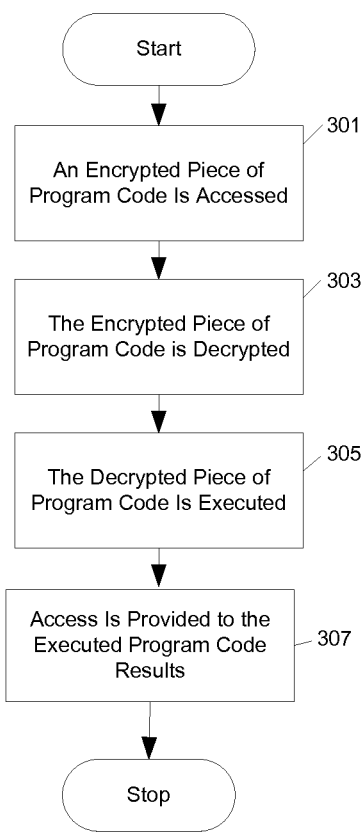
FIG. 3 shows a flowchart of operations performed in a method for code protection using online authentication and encrypted code execution according to one embodiment.
Figure 6:
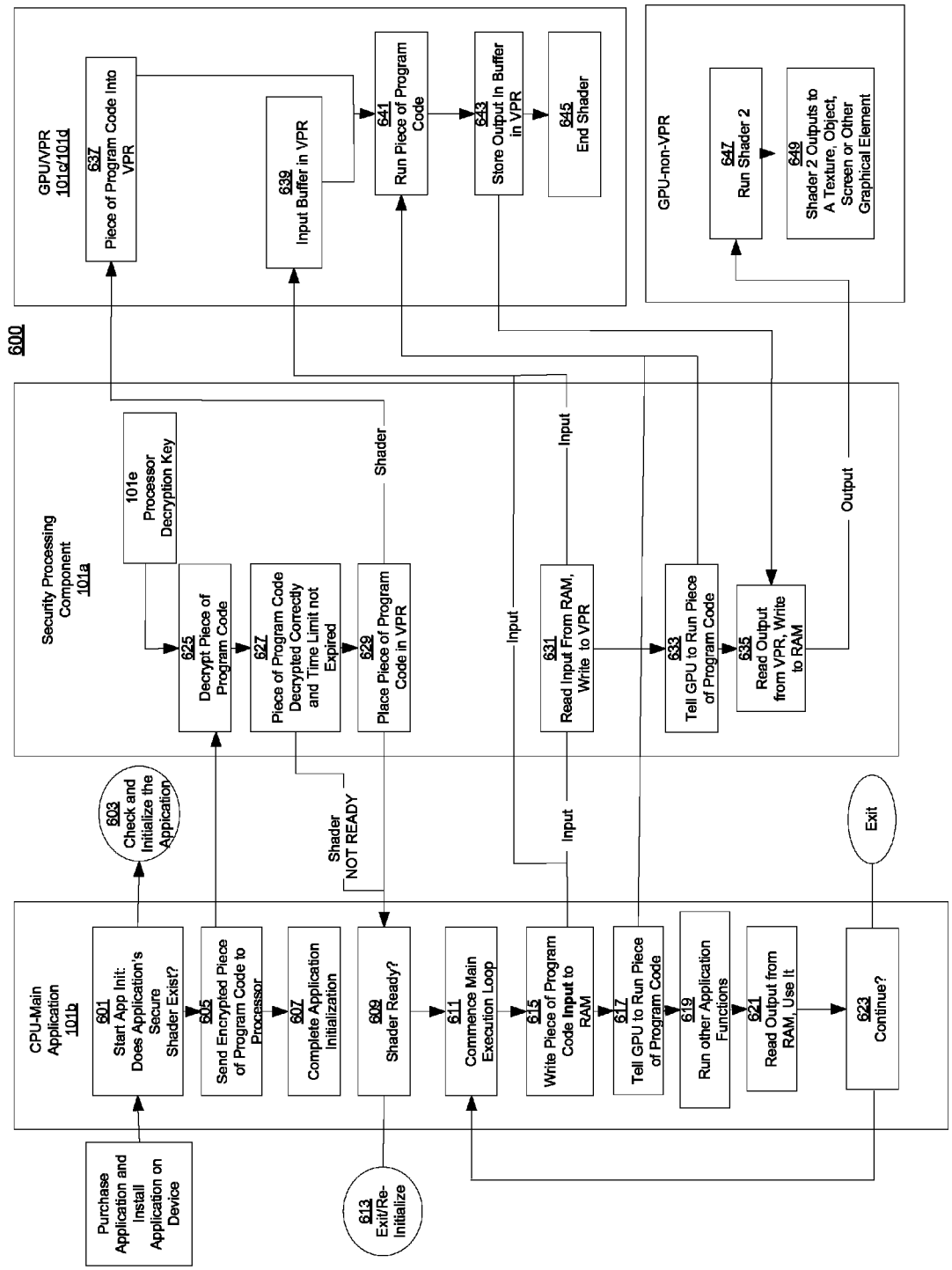
FIG. 6 shows a flowchart of operations that are performed in a method for code protection that uses online authentication and encrypted code execution where running of a second shader from a non-video protected region (VPR) location is performed by a GPU.
Figure 7:
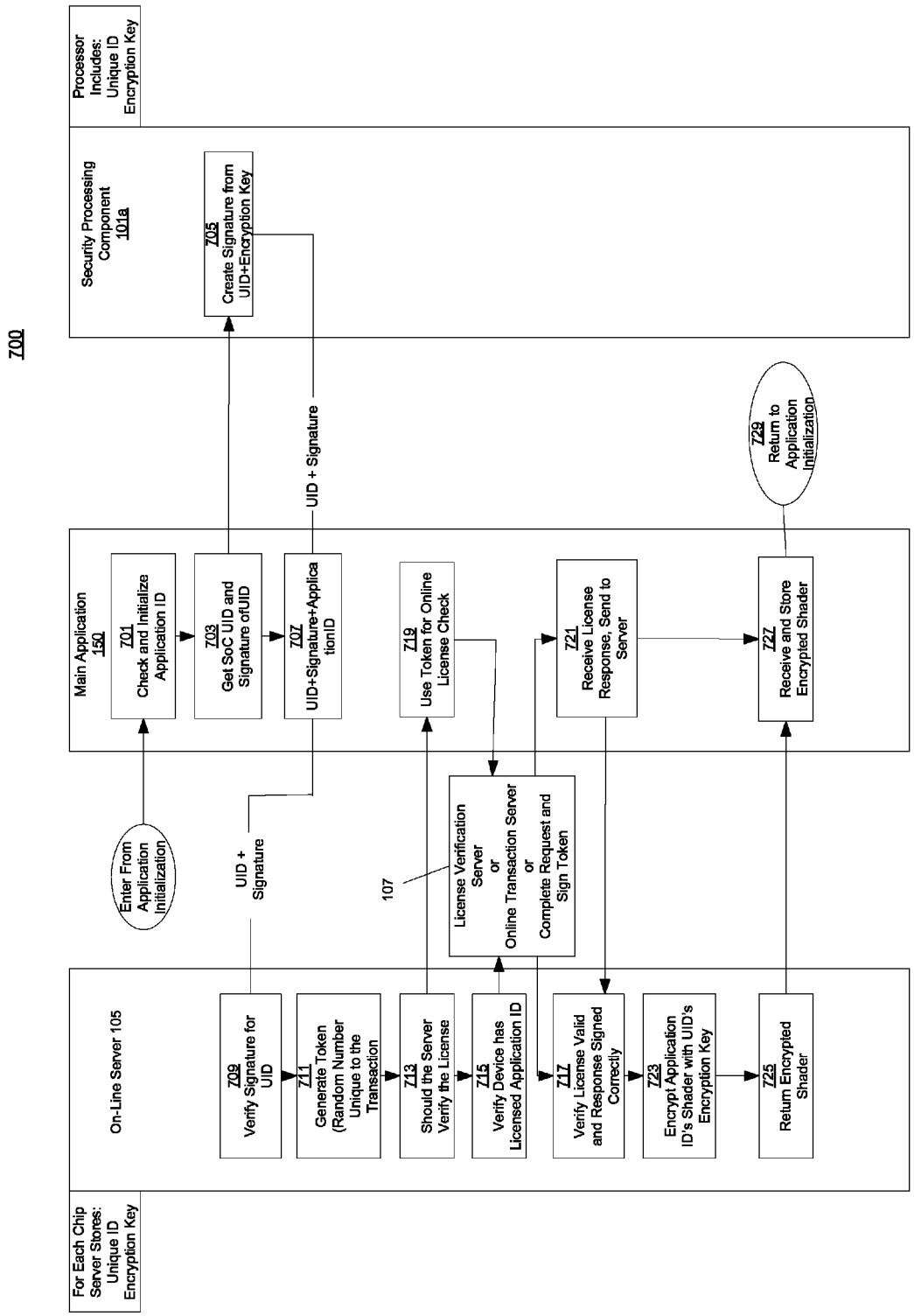
FIG. 7 shows a flowchart of authentication operations that are performed as a part of a method for code protection that uses online authentication and encrypted code execution according to one embodiment.

Method for Code Protection Using Online Authentication and Encrypted Code Execution According to One Embodiment FIG. 3 shows a flowchart 300 of the operations performed in a method for code protection using online authentication and encrypted code execution according to one embodiment. FIGS. 4, 5 and 6, show flowcharts 400, 500 and 600 of exemplary embodiments of the method of FIG. 3. FIG. 7 shows a flowchart 700 of operations performed in an authentication process of a method for code protection according to one embodiment. The flowcharts include processes that, in one embodiment can be carried out by processors and electrical components under the control of computer-readable and computer-executable instructions. Although specific operations are disclosed in the flowcharts, such operations are exemplary. That is the present embodiment is well suited to performing various other operations or variations of the operations recited in the flowchart. Although specific operations are disclosed in the flowcharts, such steps are exemplary. That is the present embodiments are well suited to performing various other operations or variations of the operations recited in the flowcharts.

Exemplary Method for Code Protection

Referring to FIG. 3, at 301, an encrypted piece of program code or "shader" (e.g., 160 in FIG. 1B) is accessed. As is discussed herein, the encrypted piece of program code is accessed by an application to which it corresponds from an on-line server (e.g., on-line server 105 in FIG. 1A), after a license for the operation of the application has been verified.

At 303, the encrypted piece of program code (e.g., 160 in FIG. 1B) is decrypted. As is discussed herein, the encrypted piece of program code is decrypted by a hardware security processing component that maintains a secret encryption key with which the encrypted piece of program code is decrypted.

At 305, the decrypted piece of program code is executed. In one embodiment, the decrypted piece of program code is executed by the security processing component (e.g., 101a in FIG. 1A). In another embodiment, the decrypted piece of program code is stored in a VPR (e.g., 101d in FIG. 1A) and executed by a GPU (e.g., GPU 101c of FIG. 1A).

At 307, access is provided to the executed program code results. In one embodiment, the executed program code results are accessed by a main application (e.g., 150 in FIG. 1B) to which it corresponds that is executing on a CPU (e.g., CPU 101b of FIG. 1A) and is used by the CPU to execute the main application. In another embodiment, when the GPU runs the decrypted piece of program code, the execution results are provided as input to the running of a second piece of program code in a non-VPR region.

Security Processing Component Running of Decrypted Code

FIG. 4 shows a flowchart of operations that are performed as a part of a method for code protection that uses online authentication and encrypted code execution where running of the decrypted code is performed by a security processing component. Referring to FIG. 4, as a part of the method, CPU 101b executes a main application (e.g., 150 in FIG. 1B) to which the decrypted code corresponds. Operations 401-421, are associated with the execution of the main application (e.g., 150 in FIG. 1B). As shown in FIG. 4, at 401, after an application has been purchased and installed on a device, application initialization can be started and it is determined whether a secure piece of program code or "shader" (e.g., 160 in FIG. 1B) for the application exists. At 403, if a secure piece of program code (e.g., 160 in FIG. 1B) for the application does not exist, the application is checked and initialized. At 405, if a secure piece of program code (e.g., 160 in FIG. 1B) for the application does exists, the encrypted piece of program code (e.g., 160 in FIG. 1B) is sent to security processing component 101a for decryption. At 407, application initialization is completed. At 409, it is determined, from security processing component 101a whether the piece of program code (e.g., 160 in FIG. 1B) is ready. At 411, if the piece of program code (e.g., 160 in FIG. 1B) is ready, the main execution loop for the application is commenced. At 413, if the piece of program code (e.g., 160 in FIG. 1B) is not ready, the application is exited or re-initialized. At 415, an instruction is sent to security processing component 101a that instructs it to invoke the piece of program code (e.g., 160 in FIG. 1B). At 417, other application functions are run. At 419, the results from the running of the piece of program code (e.g., 160 in FIG. 1B) are obtained from security processing component 101a and used. At 421, it is determined whether execution is to continue. If it is determined that execution is to continue, control is returned to 411. If it is determined that execution is completed, then the execution loop is exited.

As shown in FIG. 4, in one embodiment, security processing component 101a decrypts and executes the piece of program code (e.g., 160 in FIG. 1B) that corresponds to the main application (e.g., 150 in FIG. 1B that executes on CPU 101b as described above). These operations, 423-431, are described with reference to FIG. 4. Referring to FIG. 4, at 423, the encrypted piece of program code (e.g., 160 in FIG. 1B) is decrypted. In one embodiment, processor decryption key 101e, is used to decrypt the piece of program code (e.g., 160 in FIG. 1B). At 425, it is determined if the piece of program code (e.g., 160 in FIG. 1B) has been decrypted correctly and if the time limit has not expired. If yes, at 427, the piece of program code (e.g., 160 in FIG. 1B) is stored in shader cache 209 of security processing device 101a and the answer "ready" is returned for the shader ready query. At 429, the piece of program code (e.g., 160 in FIG. 1B) is accessed from shader cache 209 and run. And, at 431, the output or result generated from running the piece of program code (e.g., 160 in FIG. 1B) is stored and provided to the main application (e.g., 150 in FIG. 1B) and state data is stored in state cache 211 (e.g., RAM, etc).

GPU Running of Decrypted Code

FIG. 5 shows a flowchart of operations that are performed as a part of a method for code protection that uses online authentication and encrypted code execution where running of the decrypted code is performed by GPU 101c. Referring to FIG. 5, as a part of the method, CPU 101b executes main application (e.g., 150 in FIG. 1B). Operations, 501-523 are associated with the execution of main application (e.g., 150 in FIG. 1B). As shown in FIG. 5, at 501, after an application has been purchased and installed on a device, application initialization can be started and it is determined whether a secure piece of program code or "shader" (e.g., 160 in FIG. 1B) for the application exists. At 503, if a secure piece of program code (e.g., 160 in FIG. 1B) for the application does not exist, the application is checked and initialized. At 505, if a secure piece of program code for the application does exist, the encrypted piece of program code (e.g., 160 in FIG. 1B) is sent to the security processing component 101a for decryption. At 507, application initialization is completed. At 509, it is determined, from security processing component 101a whether the piece of program code (e.g., 160 in FIG. 1B) is ready. At 511, if the piece of program code (e.g., 160 in FIG. 1B) is ready, the main execution loop for the application is commenced. At 513, if the piece of program code (e.g., 160 in FIG. 1B) is not ready, the application is exited or re-initialized. At 515, the relevant piece of program input (e.g., 160 in FIG. 1B) is written to RAM. At 517, an instruction is sent to GPU 101c instructing GPU 101c to run the piece of program code (e.g., 160 in FIG. 1B). At 519, other application functions are run. At 521, the result of running the piece of code or "shader" (e.g., 160 in FIG. 1B) is obtained from RAM and used. At 523, it is determined whether execution is to continue. If it is determined that execution is to continue, control is returned to 511. If it is determined that execution is completed, then the execution loop is exited.

As shown in FIG. 5, in one embodiment, security processing component 101a decrypts the piece of program code (e.g., 160 in FIG. 1B), places the piece of program code (e.g., 160 in FIG. 1B) into the VPR 101e and instructs the GPU 101c to run the piece of program code (e.g., 160 in FIG. 1B). These operations, 525-535, are described with reference to FIG. 5. Referring again to FIG. 5, at 525, the encrypted piece of program code (e.g., 160 in FIG. 1B) is decrypted. In one embodiment, processor decryption key 101e, is used to decrypt the piece of program code (e.g., 160 in FIG. 1B). At 527, if it is determined that the piece of program code (e.g., 160 in FIG. 1B) has been decrypted correctly and that a time limit has not expired, the piece of program code (e.g., 160 in FIG. 1B) is placed into the VPR at 529. At 527, if it is determined that the piece of program code (e.g., 160 in FIG. 1B) has not been decrypted correctly, this information is provided to the main application (e.g., 150 in FIG. 1B) executing on the CPU 101*b* (see operation 509). At, 531, after the piece of program code input has been written to RAM, the piece of program code input is read from RAM and written to VPR 101*d*. At 533, security processing component 101*a* instructs GPU 101*c* to run the piece of program code (e.g., 160 in FIG. 1B). At 535, the output that is generated from running the piece of program code (e.g., 160 in FIG. 1B) is read from the VPR and written to RAM. In one embodiment, depending on the hardware that is used, either the main application (e.g., 150 in FIG. 1B) or security processing component (e.g., 101*a* in FIG. 1A) can perform operations 531 and 533.

As shown in FIG. 5, VPR 101*d* receives the piece of program code (e.g., 160 in FIG. 1B) and provides a space for secure execution of the piece of program code (e.g., 160 in FIG. 1B). These operations, 537-545, are described with reference to FIG. 5. Referring to FIG. 5, at 537, VPR 101*d* receives the piece of program code (e.g., 160 in FIG. 1B). At 539, the piece of program code (e.g., 160 in FIG. 1B) is placed into an input buffer in VPR 101*d*. At 541, after being instructed to run the piece of program code (e.g., 160 in FIG. 1B), the piece of program code (e.g., 160 in FIG. 1B) is run by GPU 101*d*. At 543, the output is stored in a buffer in VPR 101*d*. In one embodiment, this output is provided to security processing component 101*a* and is accessed by the main application that executes on CPU 101*b*. And, at 545, operations related to the piece of program code (e.g., 160 in FIG. 1B) are ended.

GPU Running of a Second Shader from a Non-VPR Location

FIG. 6 shows a flowchart of operations that are performed as a part of a method for code protection that uses online authentication and encrypted code execution where running of a second shader from a non-VPR location is performed by GPU 101*c*. These operations are described with reference to FIG. 6. The description of operations 601-645 are similar to those for operations 501-545 described above and thus are not repeated. Referring to FIG. 6, at 647, the output from a running of a piece of program code or "shader" is received and used to run a second shader. And, At 649, the second shader is output to a texture, screen object or other graphical element. In one embodiment, depending on the hardware that is used, either the main application (e.g., 150 in FIG. 1B) or the security processing component (e.g., 101*a* in FIG. 1A) can perform operations 631 and 633.

Authentication

FIG. 7 shows a flowchart of authentication operations that are performed as a part of a method for code protection that uses online authentication and encrypted code execution according to one embodiment. Referring to FIG. 7, at 701 the application ID is checked and initialized. At 703, the user ID of the involved system on chip (SoC) and a user ID signature is obtained. At 705, a signature is created from the user ID and the encryption key (security processing component). At 707, the user ID, signature and application ID is created by the main application (e.g., 150 in FIG. 1B). At 709, the signature for the user ID is verified. At 711, a token is generated. At 713, it is determined whether the server should verify the license. If yes, at 715 it is determined whether the device has a licensed application ID (e.g., using license verification server 107 which completes the request and signs the token). Then, at 717 a verification of the validity of the license and whether the response is signed correctly is made. If no, at 719 the token is used for an online license check (e.g., using license verification server 107 which completes the request and signs the token). Then, at 721 the license response is received and sent to server (see 717). At 723, a piece of program code or "shader" that corresponds to the application ID is encrypted. At 725, the encrypted shader is provided to the application (e.g., 150 in FIG. 1B). And, at 727, the shader is received and stored by the application (e.g., 150 in FIG. 1B), and control is returned to application initialization at 729. It should be appreciated that the authentication and verification operations discussed with reference to FIG. 7 are only exemplary, and that any secure, server based, authentication and verification processes, whose successful completion results in the providing of the encrypted shader to the main application, as discussed herein (see 725), can be employed.

An exemplary feature of the methodology described herein is that the applications involved are missing a key piece of program code (e.g., 160 in FIG. 1B) that can be downloaded after license verification. And, that the missing piece of program code (e.g., 160 in FIG. 1B) is encrypted for a specific security processing component. Thus, the decryption and running of the piece of program code (e.g., 160 in FIG. 1B) can be restricted to the licensee's individual device. Moreover, the piece of program code (e.g., 160 in FIG. 1B) can be run in a private and secure manner such that theft can be prevented. In one embodiment, if the licensee has multiple devices, license verification is performed each time the application is installed and run on a respective device.

Because of the herein described architecture, if the herein described license check is removed, the application (e.g., 150 in FIG. 1B) will be run with a key piece of program code missing. Consequently, although the application (e.g., 150 in FIG. 1B) might run, it may not function correctly. For example, if a game is formatted in accordance with the principles described herein, and a portion of its artificial intelligence (AI) is derived from a missing piece of program code (e.g., 160 in FIG. 1B), the AI will only be able to execute if the license check passes (the license is verified). Accordingly, if calls are removed to circumvent the license checks, the game may run, but without proper AI. Moreover, without proper AI the game is likely to be unplayable as the AI forms a key component of gameplay.

In another example, if a game's collision detection code runs as binary by the security processing component (e.g., 101*a* in FIG. 1A), and licensing server checks and calls to the security processing component (e.g., 101*a* in FIG. 1A) are removed, illegitimate copies execute but the player can walk through walls and other objects in the game, thus ruining the experience.

In yet another example, if a word processor's "generate available fonts" function is executed as a binary by the security processing component and calls to the security processing component are removed, the application (e.g., 150 in FIG. 1B) may not generate the list of available fonts. Moreover, without the fonts, the user cannot write anything, making the pirated word processor useless.

With regard to exemplary embodiments thereof, a component, architecture and methods for code protection are disclosed. A method includes using a security processing component to access an encrypted portion of an application program that is encrypted by an on-line server, after a license for use of the application program is authenticated by the on-line server. The security processing component is used to decrypt the encrypted portion of the application program using an encryption key that is stored in the security processing component. The decrypted portion of the application program is executed based on stored state data. Results are provided to the application program that is executing on a second processing component.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

We claim:

1. A method for code protection, comprising:
   using a processing component, accessing an encrypted portion of an application program that is encrypted by an on-line server, after a license for use of said application program is verified by said on-line server;
   using said processing component, decrypting said encrypted portion of said application program using an encryption key stored in said processing component wherein a corresponding decrypted portion of said application program is generated;
   executing said decrypted portion of said application program using stored state data and generating execution results; and
   using said processing component, providing said results to a non-encrypted portion of said application program that is executing on a second processing component, wherein said decrypted portion of said application program associated with said encrypted portion of said application program from said on-line server is executed in conjunction with said non-encrypted portion of said application program.

2. The method of claim 1 wherein access to said encryption key is restricted to said processing component.

3. The method of claim 1 wherein said executing said decrypted portion of said application program is performed by said processing component.

4. The method of claim 1 wherein said executing said decrypted portion of said application program is performed by a graphics processing component.

5. The method of claim 4 wherein said decrypted portion of said application program is stored in a designated video protected region of a memory and wherein a capacity to read from said video protected region is restricted to said processing component.

6. The method of claim 5 wherein a capacity to read and write from said video protected region is restricted to said processing component.

7. The method of claim 1 wherein said processing component is one of embedded in said second processing component, wherein said second processing component is a main processor of a system on chip, and in a graphics processing component.

8. The method of claim 1 wherein a section of memory that provides input to, and receives output from, said processing component is one of encrypted and non-encrypted.

9. The method of claim 1 wherein said state data comprises short term state data and long term state data that is one of maintained on chip and maintained off chip.

10. A security processing component, comprising:
    an accessing component that accesses an encrypted portion of an application program that is encrypted by an on-line server, after a license for use of said application program is verified by said on-line server;
    a decrypting component that decrypts said encrypted portion of said application program using an encryption key stored in said security processing component, wherein a corresponding decrypted portion of said application program is generated;
    an access providing component that provides access to execution results generated from an execution of said decrypted portion to a non-encrypted portion of said application program, wherein said decrypted portion of said application program associated with said encrypted portion of said application program from said on-line server is executed in conjunction with said non-encrypted portion of said application program.

11. The security processing component of claim 10 wherein access to said encryption key is restricted to said security processing component.

12. The security processing component of claim 10 further comprising an executing component that executes said decrypted portion of said application program.

13. The security processing component of claim 10 wherein a graphics processing component executes said decrypted portion of said application program.

14. The processing component of claim 13 wherein a designated video protected region of a memory stores said decrypted portion of said application and wherein a capacity to read from said video protected region of said memory is restricted to said security processing component.

15. A system on chip, comprising:
    a processor;
    a graphics processor; and
    a security processing component, comprising:
      an accessing component that accesses an encrypted portion of an application program that is encrypted by an on-line server, after a license for use of said application program is verified by said on-line server;
      a decrypting component that decrypts said encrypted portion of said application program using an encryption key stored in said processing component wherein a corresponding decrypted portion of said application program is generated;
      an access providing component that provides access to execution results generated from an execution of said decrypted portion to a non-encrypted portion of said application program, wherein said decrypted portion of said application program associated with said encrypted portion of said application program from said on-line server is executed in conjunction with said non-encrypted portion of said application program.

16. The system on chip of claim 15 wherein said encryption key is restricted to said processing component.

17. The system on chip of claim 15 further comprising an executing component that executes said decrypted portion of said application program.

18. The system on chip of claim 15 wherein said graphics processor executes said decrypted portion of said application program.

19. The system on chip of claim 15 wherein said security processing component is embedded in said CPU and wherein said CPU is a main processor of said system on chip.

20. The system on chip of claim 15 wherein said security processing component is embedded in said GPU.

\* \* \* \* \*